3,352,660
METHOD OF PROMOTING MATURATION
OF COTTON PLANTS
Price H. Parham, Kalamazoo, Mich., assignor to The Upjohn Company, Kalamazoo, Mich., a corporation of Delaware
No Drawing. Filed Dec. 14, 1964, Ser. No. 418,334
16 Claims. (Cl. 71—70)

This invention pertains to a chemagronomic process, and is more particularly directed to the use of certain 2-halonitroanilines for promoting maturation of cotton plants and uniform ripening of cotton bolls.

Cotton is a crop of great economic importance throughout the world. The fibers are used for textiles, cordage, battings, felts, toy stuffings, and oil filters; and from the seeds are prepared cottonseed oil for salad dressings and cooking oils as well as cottonseed cake and meal (high protein animal feedstuff). Further appreciation for the importance of cotton relative to other agricultural crops can be gained by reference to an estimate that at least 11,000,000 American workers and their families directly depend upon cotton for their livelihood. The United States produced about 13.9 million bales of cotton annually during the years 1958 through 1962. In 1963, U.S. production was estimated at 15.5 million bales, worth about 2.5 billion dollars. The crop was produced on about 14.2 million acres of land. In 1926, an estimated crop of about 18 million bales was produced on about 44.6 million acres.

The foregoing statistics indicate remarkable advances in the efficiency of cotton production. To be sure, increased productivity of this magnitude could not be attributed to one or two factors, but is due in part to retirement of submarginal land, improved soil fertility management practices, planting improved varieties, improvements in cultural practices such as weed and insect control, and improved methods of harvesting. These technological advancements have not, however, solved all the problems of cotton production and they have spawned some of their own. One of the unsolved problems resulting from improved soil fertility management and improved more productive varieties, and improved cultural practices has been heavy stands of cotton plants bearing bolls of different ages and dense leaf growth. The dense leaf canopy inhibits air movement and shades the ground from sunlight, thus retarding drying and the opening of the mature cotton bolls. Consequently, stands of cotton are generally defoliated with defoliating chemicals before picking. Nevertheless, the bolls are not ordinarily ripe at the same time and repeat pickings are necessary.

This invention provides a solution to the problem of uneven maturation of cotton plants and delayed boll ripening, and provides a method for ripening substantially all of the crop at one time. The method of this invention promotes maturation of cotton plants and provides means of producing cotton of uniformly high quality and grade. In accordance with the invention, it has now been found that 2-halo-nitroanilines of the formula:

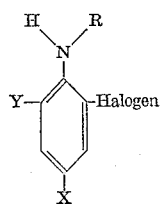

I promote maturation of cotton plants and uniform ripening of the bolls. In the foregoing Formula I, R is a member selected from the group consisting of hydrogen and methyl, and X and Y are members selected from the group consisting of halogen and nitro, at least one of X and Y being nitro.

Representative 2-halo-nitroanilines in accordance with the formula include: 2,4-dichloro-6-nitroaniline; 2,6-dichloro-4-nitroaniline; 6-bromo-4-chloro-2-nitroaniline; 6-chloro-2,4-dinitroaniline; 2-bromo-6-chloro-4-nitroaniline; 4-bromo-6-chloro-2-nitroaniline; 4,6-dichloro-N-methyl-2-nitroaniline; 2,6-dichloro-N-methyl-4-nitroaniline; 2,6-dibromo-4-nitroaniline; and 2,6-diiodo-4-nitroaniline.

The method of this invention is accomplished by applying a 2-halo-nitroaniline (compound according to Formula I) to cotton plants after boll formation and growth are substantially complete but before a substantial proportion of bolls are cracked. Choice of the optimum time for application requires exercise of judgment in view of past, present, and prospective weather conditions, and cultural history of the plants. In general, young cotton plants grow for some time before the "squares" or buds begin to form. The first squares will form on lowermost branches. The growing crown of the plant continues to branch, upon which branches more squares are formed. The rate of square formation is progressive and a great proportion of the squares are formed as the plant reaches a maximum growth phase. The squares burst into bloom about 3 weeks after they are formed, and the cotton bolls are ready to crack about 45 to 65 days after bloom.

The first formed bolls on lower branches usually ripen a little before the main crop bolls; but after the latter are fully developed, chemically stimulated maturation of the plant speeds up ripening so that substantially all the cotton can be picked at one time. Early planted cotton under ideal growing conditions will form bolls over a longer period than, for example, late planted cotton with dry fall weather. In either event, the 2-halo-nitroanilines are preferably applied after boll formation is substantially complete, but before a substantial proportion of the bolls are cracked.

In general, the compounds are applied just before the first bolls begin to crack. At this time the main crop bolls will be well developed and further square formation is wasteful of plant vigor.

The 2-halo-nitroaniline maturants can be applied in one application or two if desired. The kinds of equipment used for application will largely determine the practice of each producer. If the compounds are applied by air the cost and availability of service will be determinative. If the compounds are applied from ground equipment, the amount of damage to the plants might be determinative. In accordance with a preferred method of the invention, one application is made when the bolls are just beginning to crack. A second application is then made about 2 weeks later when about 5% to 10% of the bolls are open.

The compounds are applied to cotton plants at a rate of about 0.5 lb. to about 5.0 lbs. per acre in the form of dust (preferred) and aqueous sprays. The latter are conveniently prepared at the time of application by mixing a dispersible powder, solution, or suspension of a 2-halo-nitroaniline with water. In general, dusts and aqueous sprays comprise adjuvants in addition to the active ingredient and carrier diluent (dust carrier or water), which promote efficacy of application. The carrier diluent and any adjuvants must be non-toxic to cotton plants.

When the method of this invention is practiced with a dust formulation, the dust can comprise from about 1% to about 90% of a finely-divided 2-halo-nitroaniline according to Formula I and from about 99% to about 10% (by weight) of a solid, finely-divided, inert carrier diluent which maintains the composition in a dry, free-flowing state. The formulation advantageously has an average particle size of less than 60 microns. Since 2-halo-nitroanilines are solids at ordinary temperature, dust formulations are readily prepared by admixing a 2-halo-nitroaniline with a solid inert carrier diluent and then milling. Preferably, however, the 2-halo-nitroaniline is dissolved in a volatile solvent, such as ethylene dichloride, methylene chloride, acetone, and the like, and then sprayed on the solid inert carrier diluent so as to assure thorough distribution. The mixture is then dried and milled to the desired size.

Solid carriers that can be used in the dust compositions include the natural clays such as china clay and bentonite, minerals in the natural state such as talc, pyrophyllite, quartz, diatomaceous earth, fuller's earth, chalk, and rock phosphate, and chemically modified minerals such as washed bentonite, precipitated calcium phosphate, precipitated calcium carbonate, precipitated calcium silicate, and colloidal silica. Dust formulations acn be applied to cotton plants using conventional means such as airplanes and ground-driven equipment. Dusting equipment which induces an electrical charge on the dust particles effectively promotes uniform distribution of the dust to all parts of the plant.

Advantageously, a dust formulation comprising a 2-halo-nitroaniline and solid, finely-divided, inert carrier diluent can also comprise adjuvant components such as stickers and adhering agents, spreaders and surfactants, and agents which prevent or retard agglomeration and caking. Representative sticking and adhering agents include acacia gum, polyvinyl alcohol, ammonium caseinate, carboxymethylcellulose, gum arabic, and dextrins (partially hydrolyzed starches), which are characteristically adhesive and cling to the surfaces of the plant. Suitable sulfactants include sodium lauryl sulfate, 1-tetradecyl-4-methylpyridinium chloride, Triton X-100 (isooctylphenoxy polyethoxyethanol), and Pluronic S-68 (ethylene oxide-propylene glycol condensate, nonionic surfactant). A surfactant can be incorporated into the dust formulation by milling, or it can be added in the form of solution with a volatile solvent such as ethanol or acetone. When a solution is added the mixture forms a paste and the paste is dried and then milled. The amount of surfactant can be from about 0.01% to about 0.5% (by weight).

A dust formulation comprising a surfactant can be dispersed in water to any desired concentration and applied to cotton plants with conventional spray equipment. A dust formulation compounded with a surfactant so as to be dispersible in water is customarily termed a wettable powder. Conveniently such wettable powders are formulated with concentrations of 2-halo-nitroaniline up to about 80% or 90%, preferably about 10% to about 60% by weight.

Surfactants useful in preparing wettable powder formulations include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. A preferred class of surfactants includes blends of sulfonated oils and polyalcohol carboxylic acid esters (Emcol H-77), blends of polyoxyethylene ethers and oil-soluble sulfonates (Emcol H-400), blends of alkylarylsulfonates and alkylphenoxy polyethoxy ethanols (Tritons X-151, X-161, and X-171), e.g., about equal parts of sodium kerylbenzene sulfonate and isooctylphenoxy polyethoxyethanol containing about 12 ethoxy groups, and blends of calcium alkylarylsulfonates and polyethoxylated vegetable oils (Agrimul $N_4S$). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The wettable powder formulations can be formulated with a mixture of surfactants of the types indicated if desired.

A suitable wettable powder formulation is obtained by blending and milling 235 lbs. of Georgia clay, 5.0 lbs. of isooctylphenoxy polyethoxyethanol (Triton X-100) as a wetting agent, 9.0 lbs. of a polymerized sodium salt of substituted benzoid long-chain sulfonic acid (Daxad 27) as a dispersing agent, and 250 lbs. of the active ingredient. The resulting formulation has the following percentage composition (parts herein are by weight unless otherwise specified):

| | Percent |
|---|---|
| Active ingredient | 50 |
| Isooctylphenoxy polyethoxyethanol | 1 |
| Polymerized sodium salt of substituted benzoid long-chain sulfonic acid | 2 |
| Georgia clay | 47 |

This formulation, when dispersed in water at the rate of 12 lbs. per 100 gals., gives a spray formulation containing about 0.72% (7200 p.p.m.) active ingredient which can be applied to cotton fields at the rate of 15 gals. per acre to give a total application of active ingredient of 0.9 lb. per acre.

2-halo-nitroanilines can also be applied to cotton plants in the form of aqueous suspensions and emulsions. Aqueous suspensions are prepared by mixing a concentrate of the active ingredient comprising a dispersing or suspending agent such that a dispersion is formed when the mixture is added to water. To facilitate the formation of a dispersion in this manner, the concentrate to be diluted with water can comprise a water-miscible solvent, for example, acetone. Aqueous emulsions are prepared by mixing with water a concentrate comprising 2-halo-nitroaniline and a water immiscible organic solvent. Advantageously, emulsifiable concentrates comprise an emulsifying agent such as carboxymethyl cellulose and a wetting agent or surfactant. An emulsifiable concentrate has about 20% to about 80%, preferably about 60% to about 80% of the 2-halo-nitroaniline active ingredient.

The active ingredients of this invention can also be applied with any of the well-known agricultural insecticides, for example, parathion, 2-chloro-4,5-dimethylphenyl methylcarbamate, 1-naphthyl methylcarbamate, and the like. When conditions require it the plants can be defoliated with a commercial defoliant such as tributyl phosphorotrithiote (preferred), calcium cyanamide, magnesium chlorate, sodium chlorate, ammonium phosphate, 3-amino-1,2,4-triazole, and the like. When a defoliant is used the formation of abscission layer appears to be promoted and maturation is further enhanced.

The following examples are illustrative of the process and products of the present invention, but are not to be construed as limiting.

*Example 1*

Six replicate plots of cotton (*Gossypium hirsutum*) 8 rows wide (40-in. rows) and 65 ft. long were treated with a dust formulation comprising 6% 2,6-dichloro-4-nitroaniline about 15 weeks after planting. The oldest bolls were just beginning to crack. The dust was applied at the rate of 30 lbs. per acre with a ground-driven electrostatic duster. The amount of 2,6-dichloro-4-nitroaniline was 1.8 lbs. per acre. Two weeks later (when about 5% to 10% of the bolls were open) another 30 lbs. per acre of the dust was applied. Three weeks after the second application the cotton plants were sprayed with 1.5 lbs. per acre of tributyl phosphorotrithioite defoliant. Three weeks later (2 months after the first application of 2,6-dichloro-4-nitroaniline), the treated plots were observed to be in much better condition for harvesting as compared with adjacent untreated plots; and about 99% of the crop was harvested in the one picking with a spindle-type picker.

The quality of the cotton were excellent, and it was relatively free from trash.

Comparable plots of cotton plants in the same field defoliated and picked in the same manner at the same time, respectively, were observed to have noticeably more leaves, and more unopened bolls. Only about 50% to 70% of the crop from these plots was harvested the first picking. The cotton bolls were not as well ripened and the seed cotton contained more trash than the cotton from the treated plots.

*Example 2*

In a similar test as described in Example 1, 45 lbs. per acre of a dust comprising 6% 2,6-dichloro-4-nitroaniline (about 2.7 lbs. of compound per acre) was applied to cotton plants just prior to boll cracking. These plots too were more uniformly defoliated and the bolls more completely open at picking time than comparable untreated plots. Again, about 99% of the total crop was obtained at the first picking.

*Example 3*

In a field test, 30 lbs. per acre of a dust comprising 6% 2,6-dichloro-4-nitroaniline was applied from an airplane when the bolls were just beginning to crack. Nine weeks later, the field was defoliated with tributyl phosphorotrithioite applied by airplane at the recommended rates. The cotton was machine picked four weeks later and substantially all the crop was obtained by the one picking.

*Example 4*

In another field test, 2,6-dichloro-4-nitroaniline was applied by airplane at the rate of 0.9 lb. per acre in each of two dust applications. The first application was made just prior to boll cracking, and the second application was made 10 days later. A defoliating amount of tributyl phosphorotrithioite was applied 4 weeks after the last treatment. One week later the plants were observed to be completely defoliated, and substantially all the bolls were open and dry. About 99% of relatively trash-free seed cotton was harvested at one picking.

*Example 5*

A ten-acre plot of variety DPL smooth leaf cotton was dusted with 2,6-dichloro-4-nitroaniline at the same rates as in Example 1 but from an airplane. No defoliant was applied, because of dry weather and an early frost. This cotton was picked by hand, and about 95% of the prospective yield was obtained the first picking. The yield was about 2 bales per acre of high grade, trash-free seed cotton.

*Example 6*

A ten-acre plot of cotton was sprayed just prior to boll cracking with 2,6-dichloro-4-nitroaniline from a helicopter. The spray was prepared by mixing 20 lbs. of a wettable powder comprising 75% (w./w.) 2,6-dichloro-4-nitroaniline with 100 gals. of water. The wettable powder contained about 7% diatomaceous earth (Celite 209), about 3% of the sodium salt of condensed naphthalene sulfonic acid (Tamol SN), about 3% isooctylphenoxy polyethoxyethanol (Triton X–114), and about 12% pyrophyllite. The spray was applied at the rate of 10 gals. per acre, thus giving 1.5 lbs. of 2,6-dichloro-4-nitroaniline per acre. Two weeks later, the field was again sprayed with a spray of the same composition at the same rate per acre. Four weeks later, a defoliant was applied at recommended rates. Defoliation was complete. Eighteen days after the defoliant spray, the cotton was picked. There was obtained 12 bales of seed cotton of good quality and free from trash.

*Example 7*

Following the procedure of Example 1, but substituting 2,4-dichloro-6-nitroaniline, 6-bromo-4-chloro-2-nitroaniline, 6-chloro-2,4-dinitroaniline, 2-bromo-6-chloro-4-nitroaniline, 4-bromo-6-chloro-2-nitroaniline, 4,6-dichloro-N-methyl-2-nitroaniline, 2,6-dichloro-N-methyl-4-nitroaniline, 2,6-dibromo-4-nitroaniline, and 2,6-diiodo-4-nitroaniline for 2,6-dichloro-4-nitroaniline, there was obtained corresponding early maturation of the cotton plants and uniform, early ripening of the seed cotton.

I claim:

1. The method of promoting maturation of cotton plants (genus Gossypium) and promoting uniform ripening of cotton bolls which comprises applying to the plants, after boll formation and growth are substantially complete but before a substantial proportion of bolls have cracked, a 2-halo-nitroaniline of the formula:

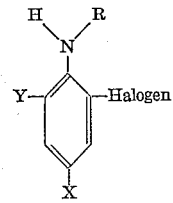

wherein R is selected from the group consisting of hydrogen and methyl, and X and Y are members selected from the group consisting of halogen and nitro, at least one of X and Y being nitro.

2. The method according to claim 1 wherein about 0.5 to about 5.0 lbs. per acre of a 2-halo-nitroaniline is applied.

3. The method according to claim 2 wherein a 2,6-dihalo-4-nitroaniline is applied.

4. Process according to claim 3 wherein 2,6-dichloro-4-nitroaniline is applied.

5. The method of promoting maturation of cotton plants (genus Gossypium) and promoting uniform ripening of cotton bolls which comprises applying to the plants from about 0.5 lb. to about 5.0 lbs. per acre of 2,6-dichloro-4-nitroaniline as a dust formulation when some of the older cotton bolls are just beginning to crack and about two weeks later applying from about 0.5 lb. to about 5.0 lbs. per acre of 2,6-dichloro-4-nitroaniline as a dust formulation.

6. The method of promoting maturation of cotton plants (genus Gossypium) and promoting uniform ripening of cotton bolls which comprises applying to the plants, about 1.8 lbs. per acre of 2,6-dichloro-4-nitroaniline as a dust formulation when some of the older cotton bolls are just beginning to crack and about two weeks later applying about 1.8 lbs. per acre 2,6-dichloro-4-nitroaniline as a dust formulation.

7. In the production of cotton, the improvement which comprises applying to cotton plants, after boll formation and growth are substantially complete but before a substantial proportion of bolls have cracked, a maturation-promoting amount of a 2-halo-nitroaniline of the formula:

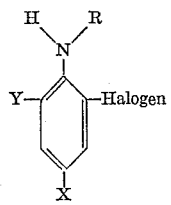

wherein R is selected from the group consisting of hydrogen and methyl, and X and Y are members selected from the group consisting of halogen and nitro, at least one of X and Y being nitro.

8. The improvement according to claim 7 wherein about 0.5 to about 5.0 lbs. per acre of the 2-halo-nitroaniline is applied.

9. The improvement according to claim 8 wherein the nitroaniline is 2,6-dihalo-4-nitroaniline.

10. The improvement according to claim 9 wherein about 1.8 lbs. per acre of 2,6-dichloro-4-nitroaniline is applied as a dust formulation to cotton plants when some of the oldest bolls are just beginning to crack and two weeks after this initial treatment applying a second about 1.8 lbs. per acre of 2,6-dichloro-4-nitroaniline as a dust formulation.

11. The improved method of defoliating cotton plants (genus Gossypium) and promoting uniform ripening of cotton bolls which comprises applying to the plants, after boll formation and growth are substantially complete but before a substantial proportion of bolls have cracked, a 2-halo-nitroaniline of the formula:

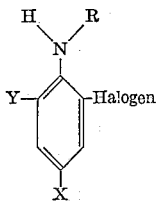

wherein R is selected from the group consisting of hydrogen and methyl, and X and Y are members selected from the group consisting of halogen and nitro, at least one of X and Y being nitro, and thereafter applying an effective amount of a defoliant selected from the group consisting of tributyl phosphorotrithioite, calcium cyanamide, magnesium chlorate, sodium chlorate, ammonium phosphate, and 3-amino-1,2,4-triazole.

12. The method of claim 11 wherein the defoliant is applied about 3 to about 10 weeks after the 2-halo-nitroaniline is applied.

13. The method of claim 12 wherein the 2-halo-nitroaniline is 2,6-dihalo-4-nitroaniline and the defoliant is tributyl phosphorotrithioite.

14. In the production of cotton (genus Gossypium), the method of promoting maturation and enhancing chemical defoliation which comprises applying to the plants, when the oldest bolls are just beginning to crack and again about two weeks later, a maturation promoting amount of a 2-halo-nitroaniline of the formula:

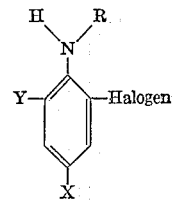

wherein R is selected from the group consisting of hydrogen and methyl, and X and Y are members selected from the group consisting of halogen and nitro, at least one of X and Y being nitro, and, about three weeks after the last application of maturant, applying an effective amount of a defoliant selected from the group consisting of tributyl phosphorotrithioite, calcium cyanamide, magnesium chlorate, sodium chlorate, ammonium phosphate, and 3-amino-1,2,4-triazole.

15. The method according to claim 14 wherein the 2-halo-nitroaniline is 2,6-dihalo-4-nitroaniline.

16. The method according to claim 15 wherein about 2 lbs. per acre of 2,6-dichloro-4-nitroaniline is applied at each application and the defoliant is tributyl phosphorotrithioite.

References Cited

UNITED STATES PATENTS

| | | | |
|---|---|---|---|
| 2,979,391 | 4/1961 | Markley | 71—2.7 |
| 3,111,403 | 11/1963 | Soper | 71—2.3 |
| 3,119,736 | 1/1963 | Clerk et al. | 167—30 |

OTHER REFERENCES

Chemical Abstracts, vol. 61, column 4894(a).

LEWIS GOTTS, *Primary Examiner.*

J. O. THOMAS, JR., E. L. ROBERTS, *Examiners.*